United States Patent [19]

Dlugos

[11] Patent Number: 4,584,648

[45] Date of Patent: Apr. 22, 1986

[54] POST OFFICE WINDOW SYSTEM WITH PROGRAMMABLE PROMPTS

[75] Inventor: Daniel F. Dlugos, Huntington, Conn.

[73] Assignee: Pitney Bowes Inc., Stamford, Conn.

[21] Appl. No.: 531,974

[22] Filed: Sep. 14, 1983

[51] Int. Cl.[4] ........................ G06F 3/02; G06F 15/21; G07G 1/12

[52] U.S. Cl. .................................... 364/464; 364/466; 364/900

[58] Field of Search ................ 364/200, 900, 464, 466

[56] References Cited

U.S. PATENT DOCUMENTS

| | | | |
|---|---|---|---|
| 4,135,662 | 1/1979 | Dlugos | 364/900 |
| 4,236,222 | 11/1980 | Loshbough et al. | 364/466 X |
| 4,286,325 | 8/1981 | Dlugos et al. | 364/900 X |
| 4,301,507 | 11/1981 | Soderberg et al. | 364/900 X |
| 4,308,579 | 12/1981 | Dlugos | 364/200 |
| 4,398,253 | 8/1983 | Karp et al. | 364/466 |
| 4,410,961 | 10/1983 | Dlugos et al. | 364/900 |
| 4,430,716 | 2/1984 | Dlugos et al. | 364/466 |
| 4,464,730 | 8/1984 | Lawrence et al. | 364/900 |

*Primary Examiner*—Felix D. Gruber
*Attorney, Agent, or Firm*—Robert H. Whisker; David E. Pitchenik; William D. Soltow, Jr.

[57] ABSTRACT

A Post Office Window System having two modes of operation and comprising a scale having a load cell for providing an analog output proportional to the weight of an item to be mailed, circuitry for providing a digital signal corresponding to the analog signal, a scale CPU for receiving the digital signal, for processing the digital signal to determine the weight of the item to be mailed, and for transmitting that weight, a processor operatively connected to the scale, to a keyboard and display, and to a postage meter.

In the normal mode of operation the processor computes the appropriate postage value for the item to be mailed from the item's weight and from information entered by an operator through the keyboard and transmits that value to a postage meter which prints appropriate indicia. The processor also displays messages, or "prompts" on the display to elicit the necessary information from the operator.

In the second, or editing mode, which is entered in response to a command from the operator, the operator may selectively edit all or portions of the prompts so that the edited prompts will be displayed upon return to the normal mode.

In one embodiment, prompts may include protected fields which may not be edited by the operator.

9 Claims, 4 Drawing Figures

POST OFFICE WINDOW SYSTEM WITH PROGRAMMABLE PROMPTS

BACKGROUND OF THE INVENTION

This invention relates to postage metering systems and more particularly to post office window type systems having a scale, a processor, a postage meter, a display and a keyboard; and still more particularly to the display of prompting messages and error messages in such systems.

Postage metering systems have been well known for use in the mailrooms of large corporations and other organizations which mail large number of items, where they have greatly increased efficiency and productivity. Recently, the postal services of various countries have begun efforts to make the advantages of such postal metering systems available to the retail customer, i.e., the person who brings one or a few items to be mailed to a post office window. In response to these efforts, manufacturers have begun to develop post office window systems which, while having many similarities to postage metering systems known in the prior art, are in many respects different from the postage metering systems of the prior art.

Though an exemplary system intended for use in a large mailroom, as taught in U.S. Pat. No. 4,308,579 to Dlugos and a post office window type system, as shown in FIG. 1, are similar in many ways, important differences do exist. Firstly, because a post office window type system is used for a wider variety of applications, including, in many countries, banking transactions, the system of FIG. 1 includes a CRT type display. In contrast, the display in the Dlugos, et al. system is limited to a small number of 7 segment display units, primarily intended to display computed postage values.

A second difference between systems such as that taught in the U.S. Pat. No. 4,308,579 and post office window type systems in that post office window type systems provide full alphanumeric keyboards.

Due to the necessary international marketing emphases, a problem which must be overcome by post office window type systems is a need to economically provide a system wherein prompt and error messages are provided in various languages and dialects. While prompts and error messages have been used in other systems, such as that taught in U.S. Pat. No. 4,135,662 and in commonly assigned copending patent application Ser. No. 491,843 to Daniels, such prior art systems have been concerned with the problems of providing some limited prompting capability in the face of the limited display capabilities of prior postage metering systems and have not been concerned with the problem of dealing with prompts in large numbers of languages and dialects.

Thus, it is the object of the subject invention to provide a post office window type system which is readily usable by operators speaking a variety of languages.

It is another object of the present invention to provide such a system which is acceptable to the postal services of countries where a number of languages or dialects are spoken.

It is another object of the subject invention to provide a post office window type system which may be maintained by technical personnel who are not intimately familiar with the language or dialect spoken by the operator.

BRIEF SUMMARY OF THE INVENTION

The above objects are achieved and the disadvantages of the prior art are overcome by means of a mailing system having two modes of operation, a normal mode and an editing mode. In accordance with the subject invention the mailing system comprises a scale; the scale further comprising a load cell providing an analog output proportional to the weight of an item to be mailed; analog circuitry for sensing the analog output and for providing a periodic digital output representative of the analog output; a scale central processing unit (CPU) for receiving the digital output and for processing the digital outputs so as to identify the weight of an item to be mailed, and for transmitting that weight to a processor; the processor being operatively connected to the scale, to a keyboard and to a display, and a postage meter operatively connected to the processor for printing indicia corresponding to the postage values determined by the processor.

In the normal mode of operation, the processor computes the postage value for an item to be mailed in response to the weight of the item transmitted from the scale CPU and other postal information input through the keyboard. The processor further includes memory means, such as floppy disc drives, for storing data, the data including predetermined messages. The processor selects and transmits to the display appropriate messages to elicit the required postal information from an operator or to inform the operator of error conditions in the system.

In the editing mode, entered in response to a command entered by the operator through the keyboard, the operator may selectively edit the messages and, in response to a second command entered through the keyboard by operator, the processor returns to the normal mode of operation and displays the edited messages.

In a second preferred embodiment, the messages include a unique protected field, which may be used by maintenance personnel and others not familiar with the local language or dialect, to identify each message even though it may have been altered.

Thus, the subject invention advantageously provides a system which may be produced economically and yet which is readily adaptable to a multiplicity of languages and dialects. Other objects and advantages of the subject invention will be apparent to those skilled in the art from consideration of the attached drawings and the detailed description set forth below.

DETAILED DESCRIPTION OF PREFERRED EMBODIMENTS OF THE INVENTION

Figure 1:
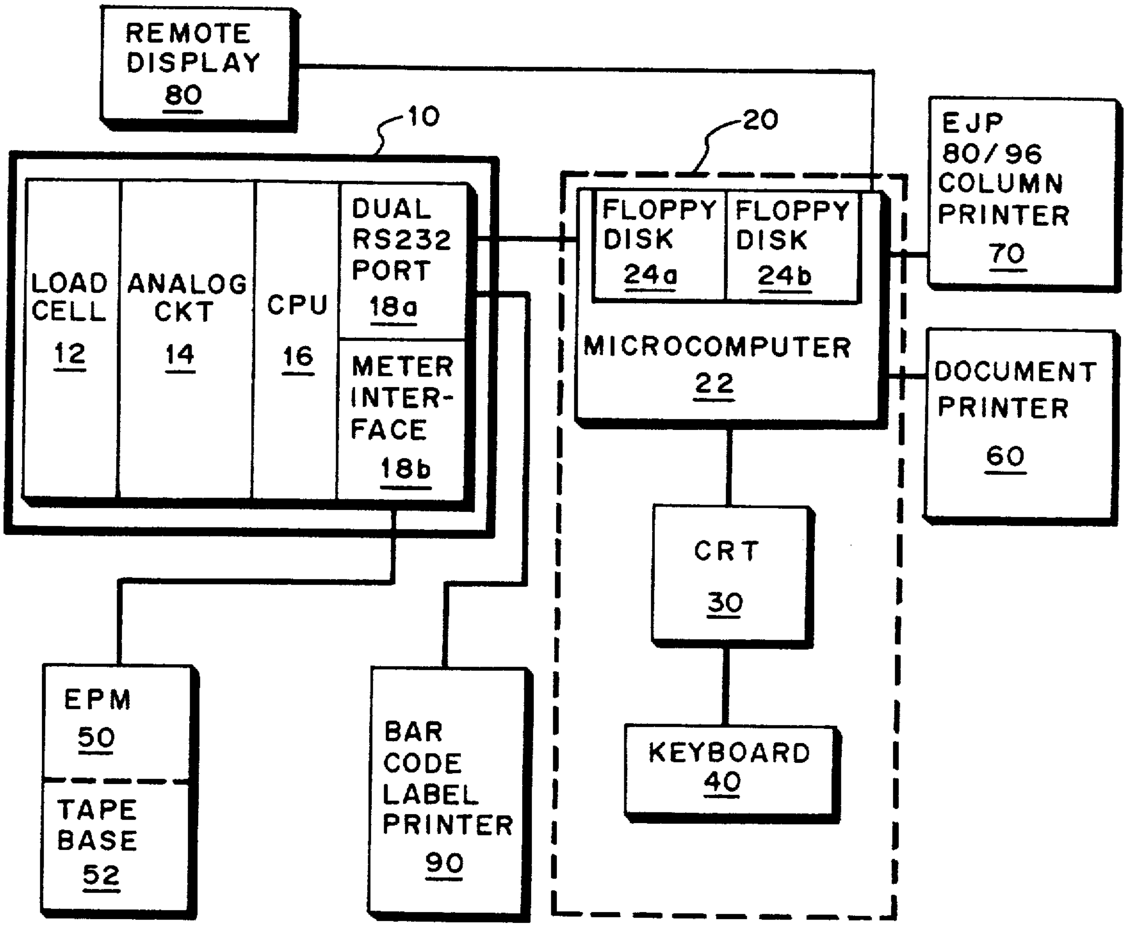
FIG. 1 shows a post office window type system in accordance with the subject invention.

FIG. 1 shows a schematic block diagram of a mailing system in accordance with the subject invention. The system comprises scale 10, microcomputer system 20 and electronic postage meter 50, meter 50 also including tape base 52. Preferably, meter 50 is a model 6500 electronic postage meter produced by Pitney Bowes Inc. of Stamford, Connecticut. Additionally, this system may also include, document printer 60 for printing shipping documents, electronic journal printer 70 for periodically printing transaction summarys, remote display 80 for displaying postage values and weights and other information to a customer, and bar code label printer 90 for printing bar codes on postage labels for later use by other postal facilities having bar code readers.

Scale 10 comprises a conventional load cell 12 which produces an analog signal proportional to the load on the cell, and conventional analog circuitry 14, which senses, amplifies and digitizes the analog signal to repetitively produce a digital signal representative of the analog signal. Scale 10 also comprises scale CPU 16 which receives the digital signal and processes it to determine the weight of the item to be mailed. Construction and operation of such processor controlled digital scales is well understood in the art and need not be discussed further there for an understanding of the subject invention. A typical example of a similar digital processor controlled scale is shown in U.S. Pat. No. 4,236,222 to Loshbough, et al. issued Nov. 25, 1980.

Microcomputer system 20 comprises microcomputer 22, operatively connected to floppy disc 24A and 24B, display CRT 30 and keyboard 40. Microcomputer system 20 is substantially similar to any of a number of commercially available microcomputer systems such as the Altos Microcomputer System produced by the Altos Corporation of San Jose, California. Preferably, computer system 20 will have a modified keyboard 40 including special function keys defining various postal information, such as class of service or special rates. A typical set of such special function keys is taught in U.S. Pat. No. 4,286,325 to Dlugos, et al, issued Aug. 25, 1981.

Microcomputer system 20 is operatively connected to scale 10 through one half of dual RS 232 port 18A. RS 232 port 18A provides a standard serial interconnection protocol well known and understood by those in the art and a description of the interconnection process is not necessary for an understanding of the subject invention. Electronic postage meter 50 is operatively connected to scale 10 through meter interface 18B. Because operation of postage meter 50 is equivalent to spending money to buy a stamp, interface 18B is specially designed to be secure and have a low error rate. Such an interface is described in U.S. Pat. No. 4,301,507 to Soderberg, et al., issued Nov. 17, 1981, which is hereby incorporated by reference.

The weight of an item to be mailed is transmitted from CPU 16 through RS 232 port 18A to microcomputer system 20. Microcomputer system 20 computes the appropriate postage value in accordance with the weight and postal information entered through keyboard 40 and transmits such information back to CPU 16, which in turn transmits the information to postage meter 50 through meter interface 18B as described in the above cited Soderberg patent. Methods for computation of postage values are known and are described in U.S. Pat. No. 4,286,325 to Dlugos, et al. issued Aug. 25, 1981, which is hereby incorporated by reference.

Figure 3A:
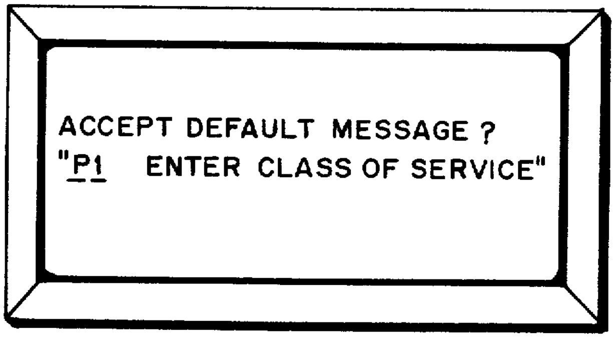
FIGS. 3*a* and 3*b* show the CRT display used in the system of FIG. 1 as a message is edited.
Figure 3B:
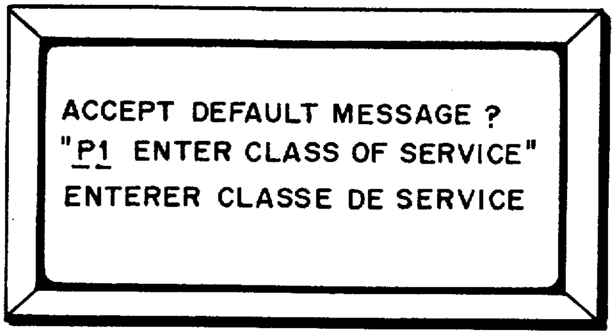
Figure 2:
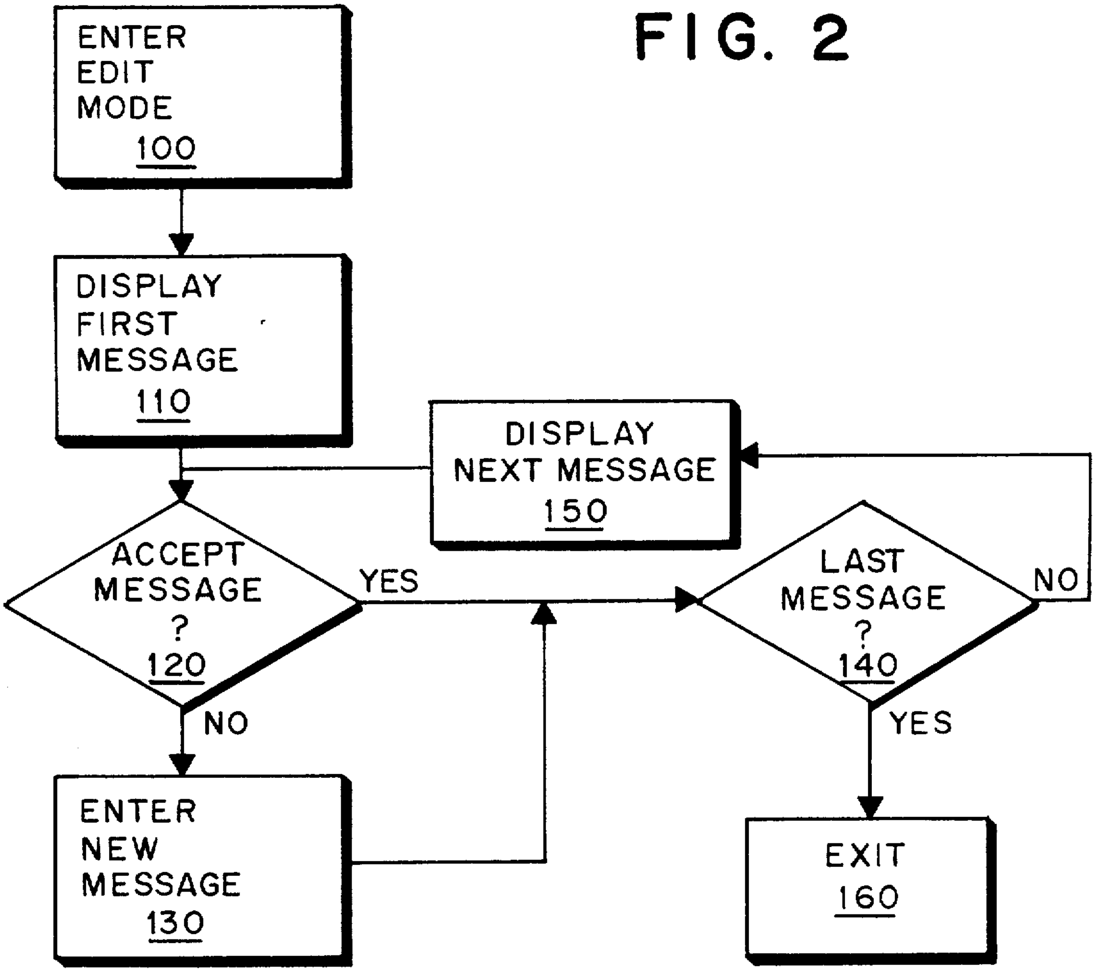
FIG. 2 shows a flow chart of the message editing process.

So that the system, FIG. 1, may be used by relatively untrained operators, including, perhaps, completely untrained postal customers, microcomputer 22 provides a series of prompt messages displayed on CRT 30 to elicit the required postal information from the operator as needed. Messages may also be displayed to indicate system errors. Use of prompts is described in U.S. Pat. No. 4,135,662, cited above. Normally, such prompts and error messages would be prerecorded on one of floppy discs 24A or 24B by the system manufacturer. However, in order to provide an economical way to provide post office window type systems to smaller countries or to regions speaking particular languages or dialects within a country (e.g., Canada, Switzerland, etc.), a method is shown in FIGS. 2 and 3 whereby a local operator may reprogram the messages. The systems enters an edit mode at 100 in FIG. 2 in response to a command entered through keyboard 40 by an operator. In a preferred embodiment, the command may be coded so that only certain classes of operators such as supervisory personnel have access to the edit mode. The system then displays the first message 110 and enters decision box 120. At this point in the edit routine, display 30 might appear as shown in the example of FIG. 3A. There, a default prompt "P1 ENTER CLASS OF SERVICE" is displayed and the system asks if it is acceptable. The operator then decides whether or not the normal prerecorded message is exceptable, and indicates his decision by entering a yes or no decision through keyboard 40. Assuming that the operator decides to edit prompt P1, the screen then appear as shown in FIG. 3B, the operator having entered in letter N to indicate that the prompt message was not acceptable. The operator may then enter an arbitrary new message which may be a foreign language, a local dialect or even a personal idiosyncratic message. However, note that in the preferred embodiment illustrated, the portion of the message field containing "P1" is protected and may not be edited. This will allow service personnel who may not be familiar with the local language or dialect to recognize the message displayed even though they do not recognize the rest of the text.

The system then enters decison box 140 to determine if the message displayed is the last message. If it is, the system exits the edit mode and, if it is not, it continues to loop through 150 displaying the next message in sequence until all messages have either been accepted or edited. After exiting the edit mode, the system will then display the edited messages in all subsequent operations. However, in a preferred embodiment, the normal or default messages are not erased but are permanently stored on the disc so that the system may return to the default messages in response to a second, preferably coded, command. Permanent storage of default allows for easy transfer of systems from region to region within a country or from country to country, and also allows simple corrections of unauthorized changes in messages.

Those skilled in the art will recognize that numerous other embodiments of the subject invention may be developed from the information provided in the above description and the attached drawings. In particular, those skilled in the art will recognize that the various subsystems of the system of FIG. 1 may be interconnected in somewhat different manners and that additional subsystems may be added or subsystems deleted without in any way departing from the spirit or essence of the subject invention. Also, those skilled in the art will recognize that other editing techniques may be used to edit the messages contained in the system of the subject invention, though the simplified technique shown is preferred since it is not anticipated that messages will be edited often.

Thus, it is to be understood that the embodiments described above and illustrated in the attached drawings are given by way of illustrations only and limitations on the subject invention are to be found only in the attached claims.

What is claimed is:

1. A postage metering system comprising:

(a) a scale, said scale further comprising:

(a.1) a load cell, said load cell providing an analog output proportional to the weight of an item to be mailed;

(a.2) analog circuitry for sensing said analog output and for providing a periodic digital output representative of said analog output;

(a.3) a scale central processing unit (CPU) for receiving said digital output, for processing said output so as to identify the weight of an item to be mailed and for transmitting said output;

(b) a processor operatively connected to said scale, to a keyboard and to a display, in a normal mode of operation said processor computing a postage value for an item to be mailed in response to the weight of said item transmitted from said scale CPU and other postal information input through said keyboard;

(c) a postage meter operatively connected to said processor for imprinting indicia corresponding to said postage value;

(d) said processor further including memory means for storing data, said data including predetermined messages;

(e) said processor selecting and transmitting to said display appropriate ones of said messages to an operator;

(f) in response to a command entered by the operator through said keyboard, said processor entering an editing mode wherein said operator may selectively edit said messages; and, (g) in response to a second command entered through said keyboard by the operator, said processor returning to said normal mode and displaying said edited messages.

2. A postage metering system as described in claim 1 wherein each of said messages comprises two fields, a first field which may be edited during said editing mode and a second field containing alphanumeric data uniquely identifying each of said messages, said data in said second field being protected from alteration in said editing mode.

3. A postage metering system as described in claim 1 wherein said command for entering said editing mode is a coded command whereby access to said editing mode may be controlled.

4. A postage metering system as described in claim 2 wherein said command for entering said editing mode is a coded command whereby access to said editing mode may be controlled.

5. A system as described in claim 1 wherein a default set of messages is permanently stored in said system and may be recalled after editing in response to a third command entered through said keyboard.

6. A system as described in claim 2 wherein a default set of messages is permanently stored in said system and may be recalled after editing in response to a third command entered through said keyboard.

7. A postage metering system as described in claim 1 wherein said messages comprised prompting messages for eliciting postal information from an operator and error messages for signaling error conditions to the operator.

8. A postage metering system as described in claim 2 wherein said messages comprised prompting messages for eliciting postal information from an operator and error messages for signaling error conditions to the operator.

9. A postage metering system as described in claim 3 wherein said messages comprised prompting messages for eliciting postal information from an operator and error messages for signaling error conditions to the operator.

* * * * *